United States Patent [19]
Bauer et al.

[11] Patent Number: 5,091,444
[45] Date of Patent: Feb. 25, 1992

[54] MOISTURE-CURING POLYURETHANE-BASED HOT-MELT COMPOSITIONS

[75] Inventors: Herbert Bauer, Paudex, Switzerland; Heinz G. Gilch, Bad Homburg, Fed. Rep. of Germany; Walter Rath, Oberursel, Fed. Rep. of Germany; Use Schumann, Oberursel, Fed. Rep. of Germany

[73] Assignee: Bostik, Inc., Middleton, Mass.

[21] Appl. No.: 478,664

[22] Filed: Feb. 12, 1990

[30] Foreign Application Priority Data

Mar. 7, 1989 [GB] United Kingdom ............. 8905133

[51] Int. Cl.$^5$ ............................................. C08K 9/04
[52] U.S. Cl. ........................... 523/209; 523/212; 524/590; 524/871; 524/872; 524/873; 524/875
[58] Field of Search ............ 523/209, 212; 524/871, 524/872, 873, 875, 590

[56] References Cited

U.S. PATENT DOCUMENTS

4,640,950  2/1987  Nishino et al. ................. 524/875
4,692,479  9/1987  Schneider et al. .............. 523/209

FOREIGN PATENT DOCUMENTS

0129858  1/1985  European Pat. Off. .
0172337  2/1986  European Pat. Off. .
0340906  11/1989  European Pat. Off. .
0369607  5/1990  European Pat. Off. .
0376461  7/1990  European Pat. Off. .

Primary Examiner—Paul R. Michl
Assistant Examiner—Edward J. Cain
Attorney, Agent, or Firm—David G. Conlin; Peter F. Corless

[57] ABSTRACT

A moisture-curing hot-melt composition comprising at least one isocyanate-terminated polyurethane prepolymer has improved sag-resistance while retaining high extrudability and is characterised in that the composition includes 1-17 wt %, preferably 3-6 wt %, of hydrophobic, siloxane-coated, fumed silica.

Especially effective polyurethane hot-melt adhesive compositions are prepared containing 4-5 wt % of the hydrophobic, siloxane-coated fumed silica.

10 Claims, No Drawings

MOISTURE-CURING POLYURETHANE-BASED HOT-MELT COMPOSITIONS

BACKGROUND OF THE INVENTION

The present invention relates to moisture-curing polyurethane-based hot-melt compositions with enhanced non-sagging.

Hot-melt adhesive compositions based on thermoplastic polymers are well known. Usually, they are applied at temperatures of about 150°-200° C. and solidify by cooling down. This leads to fast setting bonds but with poor temperature resistance.

Moisture-curing hot-melt adhesive compositions based on polyurethane prepolymers are also well known. They are usually applied at temperatures between 90 and 160° C. Curing with environmental moisture leads to bonds with superior thermal and hydrolytic stability.

All these hot-melt adhesive compositions are low viscous liquids at application temperature because of the requirement for workability of adhesive and effective wetting of substrates.

Problems may occur when applying larger beads or thicker layers of such compositions, particularly with vertical applications, when the melt tends to flow down or spread uncontrollably before solidification takes place.

Accordingly, it is the object of the present invention to provide a moisture-curing polyurethane-based hot-melt composition with improved sag resistance or high structural viscosity, i.e. with high viscosity at low shear rate and low viscosity at high shear rate.

It has been proposed to incorporate thixotropic agents in one-part moisture-curing polyurethane adhesive or sealant compositions.

European patent application 0.244.608 discloses a reactive hot-melt adhesive containing thermoplastic isocyanate binder and thixotropic agent.

Several thixotropic agents are disclosed, however, without detailed specification. However, the disclosed composition can still de deformed visco-plastically after cooling.

Our co-pending UK patent application 8829524.1 discloses a hot-melt glue-stick comprising at least one ethylene vinyl acetate copolymer characterised by the inclusion of 1-15 wt%, preferably 5-8 wt%, of fumed silica.

SUMMARY OF THE INVENTION

According to the present invention we provide a moisture-curing hot-melt composition comprising at least one isocyanate-terminated polyurethane prepolymer characterised in that the composition includes 1-17 wt%, preferably 3-6 wt% hydrophobic, siloxane-coated, fumed silica.

The polyurethane composition of the invention may comprise at least one prepolymer based on crystalline polyester with a melting point of 45°-65° C., a prepolymer based on an amorphous polyester with a glass transition temperature above room temperature or a prepolymer with a Tg above room temperature based on amorphous polyethers or polyesters with a glass transition temperature far below room temperature.

The present invention is particularly effective with a quick-setting polyurethane adhesive composition comprising a mixture of at least two amorphous polyurethane prepolymers, each prepolymer providing a different glass transition temperature, preferably one prepolymer with a glass transition temperature above room temperature and a second prepolymer with a glass transition temperature below room temperature. Such compositions are described and claimed in our copending UK patent application 88 10701.6.

The present invention is also particularly effective with a quick-setting, hot-melt polyurethane composition comprising a mixture of at least two polyurethane prepolymers including a first polyether-based polyurethane prepolymer having a glass transition temperature above room temperature and a second polymer or polyurethane prepolymer with a glass transition temperature below room temperature. Such compositions are described and claimed in our copending UK patent application 88 26702.6

The composition according to the invention is solid at room temperature with a phase transition above room temperature. Phase transition may either be a crystalline melting point between 45° and 65° C. or a glass transition temperature. After cooling, such a composition cannot be deformed plastically and the so-called hot-melt has high cohesive strength even before curing.

Theoretically, the efficiency of fumed silica as a thixotropic agent is explained by hydrogen bonds of water or hydroxyl groups on the surface of the silica particles. Moisture-curing polyurethane hot-melts according to the invention are based on isocyanate-terminated prepolymers. It would be expected that the reaction of isocyanate with the absorbed water or hydroxyl groups of the fumed silica would result in breakdown of thixotropy.

Surprisingly, we have found that siloxane-coated hydrophobic fumed silica materials can be used as thixotropic agents for moisture-curing polyurethane compositions in the presence of isocyanate with a phase transition above room temperature, even if applied at elevated temperatures between 90° and 140° C., without significant change in flow characteristics even over periods of several months.

Effective use of hydrophobic fumed silica in products containing isocyanate, manufactured or applied at temperatures above 100° C., would not have been predicted. Especially effective polyurethane adhesive compositions can be prepared containing 4-5 wt% of the hydrophobic, siloxane-coated fumed silica.

The thixotropic agent used in the invention is usually added directly under moderate stirring to the molten hot-melt composition. Stirring is continued until the mixture becomes homogeneous.

The polyurethane compositions have greatly enhanced non-sagging properties and are useful as adhesives.

DETAILED DESCRIPTION OF THE INVENTION

In order that the present invention be better understood, preferred embodiments will now be described in detail with reference to the following examples:

EXAMPLE 1

100 g of a polyhexanedioladipate (molecular weight 3,500) and 13.5 g methylene diphenyl diisocyanate (MDI) are heated in a closed reactor at approx. 100° C. for one hour. 4.7 g the hydrophobic, siloxane-coated, fumed silica identified under the tradename AEROSIL R 202 and sold by Degussa AG of Germany are added under moderate stirring.

In order to appreciate the merits of the invention, a number of comparative compositions were also prepared:

COMPARATIVE EXAMPLE A 100 g of a polyhexanedioladipate (molecular weight 3,500) and 13.5 g MDI are heated in a closed reactor at approx. 100° C. for one hour. 2.3 g Aerosil R 202 are added under moderate stirring.

COMPARATIVE EXAMPLE B 100 g of a polyhexanedioladipate (molecular weight 3,500) and 13.5 g MDI are heated in a closed reactor at approx. 100° C. for one hour. 7.2 g Aerosil R 202 are added under moderate stirring.

COMPARATIVE EXAMPLE C 100 g of a polyhexanedioladipate (molecular weight 3,500) and 13.5 g MDI are heated in a closed reactor at approx. 100° C. for one hour. 9.9 g hydrophobic fumed silica, dichlorodimethylsilane treated, sold under the tradename AEROSIL R 972 by Degussa AG of Germany are added under stirring.

COMPARATIVE EXAMPLE D 100 g of a polyhexanedioladipate (molecular weight 3,500) and 13.5 g MDI are heated in a closed reactor at approx. 100° C. for one hour. 6 g the hydrophobic fumed silica sold under the tradename AEROSIL R 200 by Degussa AG of Germany are added under stirring.

COMPARATIVE EXAMPLE E 100 g of a polyhexanedioladipate (molecular weight 3,500) and 13.5 g MDI are heated in a closed reactor at approx. 100° C. for one hour.

The properties of the products of Example 1 and of the Comparative Examples were measured and are compared in the following table.

Sagging and resistance to sagging was evaluated by observation of a bead of composition of 5 mm diameter applied to a vertical panel and held at 100° C. for 10 minutes.

TABLE

| Viscosity (Pa.s) at 100° C. Shear Rate ($s^{-1}$) | EXAMPLE | | | | | |
|---|---|---|---|---|---|---|
| | 1 | A | B | C | D | E |
| 3.6 | 98 | — | — | 216 | 216 | 20 |
| 7.1 | 69 | — | — | 172 | 167 | 20 |
| 14.2 | 54 | — | — | 140 | 137 | 20 |
| 28.5 | 45 | — | — | 115 | 112 | 20 |
| Sagging Test (mm) | <2 | free flow | 0 | 14–20 | 0 | free flow |
| Extrusion Rate | high | high | low | low | low | high |

As can be seen from the Table, the composition of Example 1 provides low sagging together with a high extrusion rate whereas this combination of properties is not achieved by any of the compositions of the comparative examples.

If low amounts of hydrophobic silica are added, as in Comparative Example A, it does not give improved sagging resistance although extrudability is good. If high amounts of hydrophobic silica are added, as in Comparative Example B, good sagging resistance is obtained but extrudability is poor.

Hydrophobic fumed silica treated with dichlorodimethyl silane (Comparative Example C) fails in both contexts, since viscosity of the melt increases without giving good sag resistance.

Comparative Example D shows that hydrophilic fumed silica gives good sag resistance but the extrudability of the composition becomes very poor.

Comparative Example E shows that in the absence of fumed silica, good extrudability but poor sag resistance results.

EXAMPLE 2

500 g (2375 mVal) polypropylene oxide diol of molecular weight 400 and 90.2 g (48 mVal) of a polypropylene oxide diol with molecular weight 4000 are placed in a closed reactor at 70° C. After addition of 4.8 g toluenesulphonyl isocyanate, 368 g (2940 mVal) MDI is added under stirring. The temperature is raised to 105° C. and stirring is continued for 1 hour. 1.19 g DBTL and 40 g Aerosil R 202 are added and stirring is continued for 1 hour at 130° C.

EXAMPLE 3

9.1 g MDI and 0.2 g toluenesulphonyl isocyanate are melted at 60° C. 65.5 g of an amorphous polyester with a molecular weight of 5600 and a Tg above room temperature consisting of ethyleneglycol, neopentylglycol, 1.6-hexane diol, terephthalic acid and isophthalic acid are added as a melt after stirring for 30 minutes at 120° C. 3.2 g MDI are added and after 30 minutes 21.8 g of a polyester with a low Tg consisting of 1.6-hexanediol, adipic acid and isophthalic acid with a molecular weight of 3500 and 4.2 g Aerosil R 202 are added under stirring.

We claim:

1. A moisture-curing hot-melt composition comprising at least one isocyanate-terminated polyurethane prepolymer wherein the composition includes 1–17 wt% of hydrophobic, siloxane-coated, fumed silica.

2. A polyurethane composition according to claim 1 containing at least one prepolymer based on crystalline polyester with a melting point of 45°–65° C.

3. A polyurethane composition according to claim 1 containing at least one prepolymer based on an amorphous polyester with a glass transition temperature above room temperature.

4. A polyurethane composition according to claim 1 containing a prepolymer with a glass transition temperature above room temperature based on amorphous polyethers or polyesters with a glass transition temperature below room temperature.

5. A polyurethane composition according to claim 1 comprising a mixture of at least two amorphous polyurethane prepolymers, each prepolymer providing a different glass transition temperature.

6. A polyurethane composition according to claim 1 comprising a mixture of at least two polyurethane prepolymers including a first polyether-based polyurethane prepolymer having a glass transition temperature above room temperature and a polyurethane prepolymer with a glass transition temperature below room temperature.

7. A polyurethane composition according to claim 1 including 4–5 wt% of hydrophobic, siloxane-coated, fumed silica.

8. A polyurethane composition according to claim 5 wherein one prepolymer has a glass transition temperature above room temperature and a second prepolymer has a glass transition temperature below room temperature.

9. A polyurethane composition according to claim 1 wherein the composition includes 3–6 wt% of hydrophobic, siloxane-coated fumed silica.

10. A polyurethane composition according to claim 1 wherein the hydrophobic, siloxane-coated, fumed silica is AEROSIL R 202.

* * * * *